United States Patent

Persson

[11] 3,709,000
[45] Jan. 9, 1973

[54] COUPLING

[75] Inventor: Erland K. Persson, Minneapolis, Minn.

[73] Assignee: Electro-Craft Corporation, Hopkins, Minn.

[22] Filed: Feb. 8, 1971

[21] Appl. No.: 113,572

[52] U.S. Cl. ..................................64/13, 64/27 NM
[51] Int. Cl. ................................................F16d 3/78
[58] Field of Search ..........64/1 V, 13, 11 R, 27 NM; 287/53; 277/DIG. 6

[56] References Cited

UNITED STATES PATENTS

| 3,039,281 | 6/1962 | Hartz | 64/27 |
| 3,274,798 | 9/1966 | Wiggins, Jr. | 64/1 |
| 3,379,135 | 4/1968 | Kaatz | 64/1 |
| 3,400,558 | 9/1968 | Haines | 64/27 |

Primary Examiner—Kenneth W. Sprague
Attorney—Carlsen, Carlsen & Sturm

[57] ABSTRACT

A coupling for substantially reducing the effects of torsional resonance between a motor and a transducer. The coupling utilizes the shear properties of a resilient material over a limited range to reduce the amplitude of torsional resonance and to increase the frequency band in which it may arise.

10 Claims, 4 Drawing Figures

INVENTOR.
ERLAND K. PERSSON

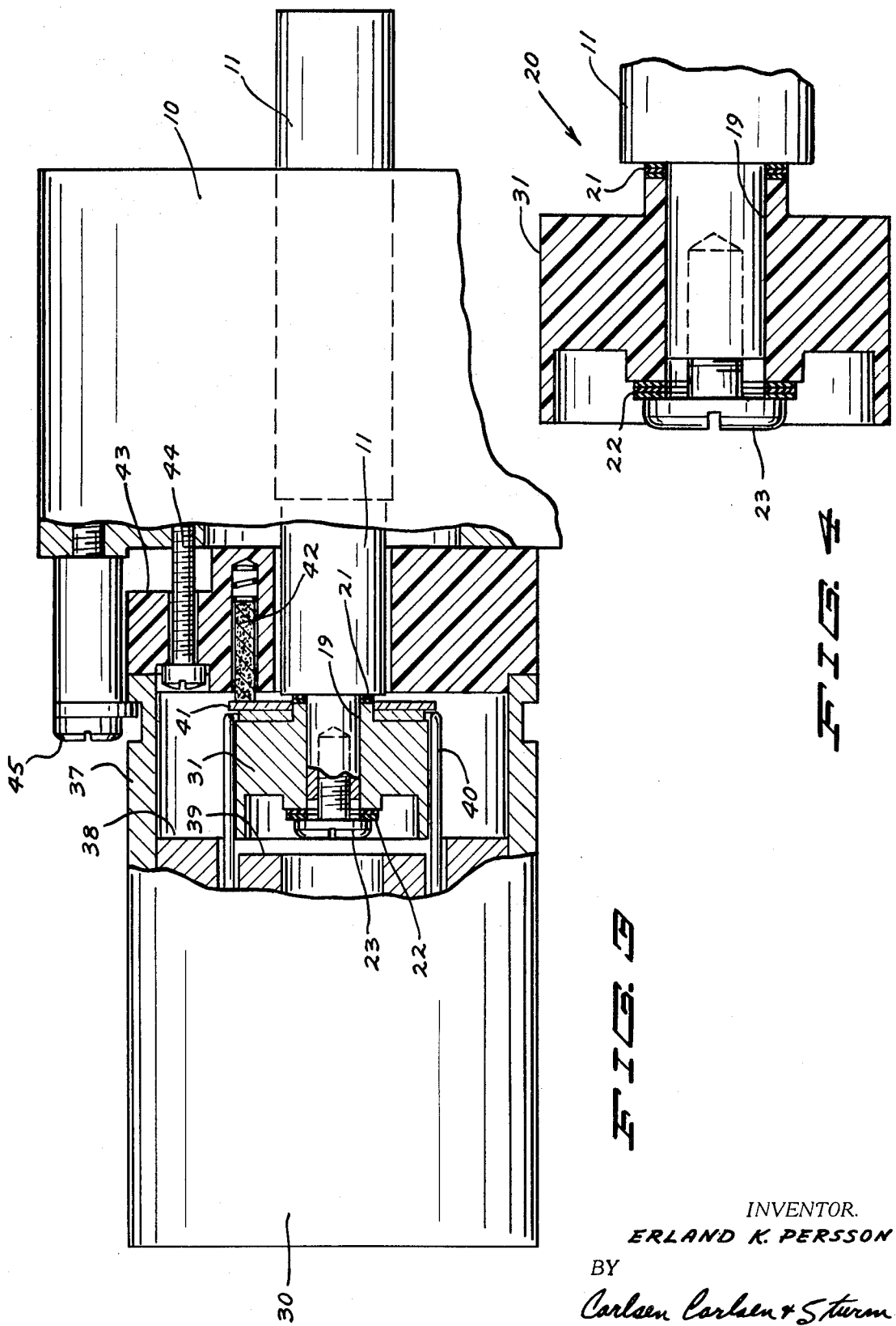

3,709,000

COUPLING

SUMMARY OF THE INVENTION

Continued refinement and development of controlled speed motors has resulted in an ever expanding utilization of high performance servo-systems to effect good regulation over the speed of a motor. Such systems generally include a command signal which is determinative of the desired speed which is applied to an amplifier that in turn energizes a motor. A transducer, which may be in the form of a tachometer, must be connected to the output of a motor to provide a feedback signal to be compared or summed with the command signal to insure proper operation of the system. As the performance requirements are raised, the band width of the system is increased such that previously tolerable resonant frequency conditions are no longer acceptable. The frequency at which the resonance has and is occurring is far too low for the performance desired even where filters and other forms of compensating networks may be used in a feedback loop to reduce the effects of such resonance.

In my invention, utilization is made of the shear properties of a visco-elastic material in a coupling device which is used to connect the output of the motor to the input of a suitable transducer, such as a tachometer. This type of a coupling arrangement it will be seen, has no significant effect on frequency response of the coupling at lower frequencies, but it does provide increased torsional damping as the frequency increases. In one embodiment of my invention, the visco-elastic properties of washers formed of silicone rubber and interposed in a coupling between a motor shaft and a tachometer shaft was found to produce the suitable desirable results to enable the performance characteristics of a servo-system to be increased by a substantial factor.

It is therefore an object of my invention to provide an improved torsional coupling.

It is a further object of my invention to provide an improved torsional coupling which satisfactorily damps torsional resonance in a drive system.

Another object of my invention is to provide a coupling of visco-elastic material to effectively reduce torsional resonance through a drive coupling.

These and other objects of my invention may become apparent from a consideration of the appended specification, claims, and drawings in which:

FIG. 3 is an enlarged partially fragmentary drawing, partially in section, showing a motor-tachometer to which the principles of my invention have been applied; and FIG. 4 is an enlarged view of a still further embodiment of my invention illustrated on a fragmentary portion of FIG. 3 to an enlarged scale.

Figure 1:
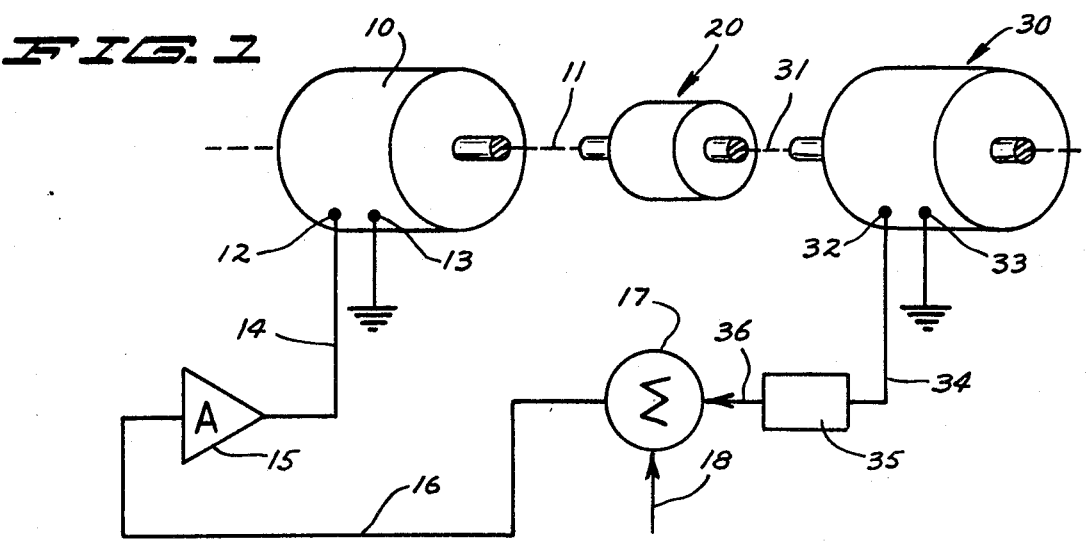
FIG. 1 is a diagrammatic and schematic drawing of a simple speed control system embodying a closed loop type of servo mechanism for control purposes.

Referring to FIG. 1 of the drawings, the simplified schematic representation of a common form of servo mechanism for controlling the speed of a motor is shown to include a motor 10 having a shaft 11 and a pair of input terminals 12 and 13. Input terminal 13 is connected to ground and input terminal 12 is connected to the output of an amplifier 15 through conductor 14. Motor output shaft 11 is connected to a coupling indicated generally by reference character 20, which is in turn connected to an input shaft 31 on a transducer 30. Transducer 30 has a pair of output terminals 32 and 33. Terminal 33 is connected to ground and terminal 32 is connected to a compensating network-filter 35 through conductor 34 and filter 35 is in turn connected to a signal comparator or summation device 17 through conductor 36. A second input on signal summation device 17 is connected to a suitable source of command signal through conductor 18. The output of signal summation device 17 is in turn connected to the input of amplifier 15 through conductor 16 to form a complete servo mechanism system for controlling the speed of motor 10 in accordance with the command signal applied to conductor 18.

Figure 2:
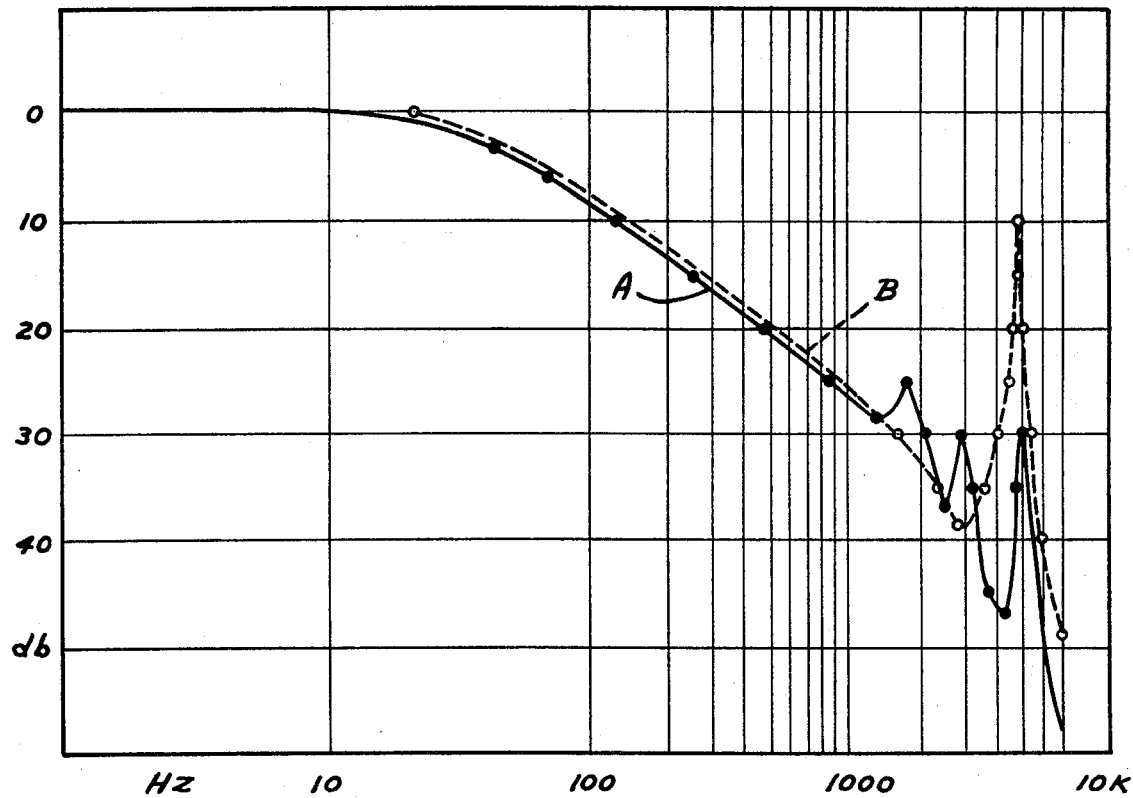
FIG. 2 is a graph including performance curve illustrating the operation of apparatus utilizing the principles of my invention.

FIG. 2 includes first and second curves that have been plotted to illustrate the performance of the general form of servo mechanism system illustrated in FIG. 1 of the drawing. The curves are representative of actual test run in which the various points from which the curves are plotted were determined in accordance with the following formula:

$$\text{Response} = 20 \log_{10} (V_u/V_m) \, (db) \qquad (a)$$

Curve b is the response of a totally undamped system and curve A is the response of a system embodying the principles of my invention. Referring to FIG. 3 of the drawings, a motor-tachometer embodying the principles of my invention is shown and like reference characters are utilized for elements similar to those described above in connection with FIG. 1. In FIG. 3, a motor 10 having an output shaft 11 extending completely therethrough on both ends is disposed at the right end of the drawing. Connected to motor 10 is a tachometer transducer, in the illustrated embodiment a DC tachometer, indicated generally by reference character 30 with a coupling, illustrating the principles of my invention disposed intermediate motor 10 and tachometer 30. Tachometer 30 includes an input shaft 31, a housing 37, a magnet 38 and an interiorally disposed pole 39 concentrically inwardly of circular magnet 38 to define an annular gap in which armature 40 may be caused to rotate to generate a signal that is applied to commutator 41 at the right end of armature 40 which may be suitably connected by brushes, one of which is illustrated as brush 42, that is suitably disposed in an insulating mounting adaptor 43. Mounting adaptor 43 is held in place on the right end of motor 10 by a plurality of suitably screw threaded fasteners and the housing 37 for tachometer 30 is likewise held in place by a plurality of suitable screw threaded members. Coupling 20 is shown comprised of first and second resilient, visco-elastic members 21 and 22 that are disposed intermediate its input shaft 31 on tachometer 30 and end 19 on output shaft 11 of motor 10. In the embodiment shown in FIG. 3 of the drawings, end 19 of output shaft 11 is provided with a suitable lubricant to allow free rotation of shaft 31 thereupon in the absence of other members of coupling 20. As may be seen washers comprising the visco-elastic members are disposed in such a manner that when screw 23 is firmly disposed in the end of end portion 19 of shaft 11, power may be transmitted from shaft 11, through the visco-elastic members to shaft 31. In the embodiment of FIG. 3 of the drawings, it may be seen that visco-elastic members 21 and 22 may be comprised of two layers of material.

In FIG. 4 of the drawings, an illustration of visco-elastic material incorporating three layers, which may be dissimilar in shear characteristics, is further shown.

It may be clear to those skilled in the art that other forms of couplings may be provided so as to obtain different response characteristics. For example, the three layered members 21 and 22 illustrated in FIG. 4 may be comprised of alternate layers of silicone rubber and steel, or other suitable metallic substances. One such rubber material found to have the properties that are desirable for effecting the response illustrated in curve A of FIG. 2 of the drawings is General Electric 632-A Silicone Molding Compound. As examples of other materials which have been observed to provide improved performance through the utilization of their visco-elastic properties in the shear mode are 3M Company types 4408, 4416, 4432 and Y-9122 — double-coated vinyl foam tape, and 3M Company Nos. 465 and 468 — dry removal adhesive transfer tape.

OPERATION

The well-known characteristics of closed looped servo systems are well known to those skilled in the art and such operation will not be discussed beyond the description set forth above.

It has been determined that a servo-system, such as set forth above, may have a sharp peak in response at approximately 4.7kHz and that this occurs because of the torsional resonance of the coupling between the motor output shaft and the transducer input shaft. Where a wide band of frequency response is desired, the likelihood of uncontrolled oscillation of the system at the torsional resonant frequency is too great to be ignored. The utilization of compensation network, such as filters, has resulted in instability at even lower frequency.

Referring again to FIG. 2 of the drawings, a response curve illustrating the result of utilizing the principles of my invention, such as are illustrated in FIGS. 3 and 4 of the drawings clearly demonstrates the vast reduction in the amplitude of the resonant frequency to a point that may easily be compensated for. The shape of curve A, when compared to the shape of the prior art apparatus curve B, clearly shows and demonstrates a reduction of 30db in the resonant peak which had previously occurred at the 4.7kHz point.

It may be apparent to those skilled in the art that the particular form of transducer shown and described for purposes of illustration only and other forms, such as shaft encoders, and the like, may also benefit from the application of the principles of my invention.

It may likewise occur to those skilled in the art that a coupling exhibiting visco-elastic characteristics may be utilized to transmit motion in other modes of operation, such as in a linear motor and transducer. In any event, the transmission of the output of a motor to a suitable transducer may be effected through a coupling including material exhibiting visco-elastic characteristics. Such couplings might include other features that may contribute to proper alignment, such as an O-ring shaped washer in place of one of the washers as shown in the drawings. A coupling may even take the form of a radial washer of substantially cylindrical shape.

Having now therefore fully illustrated and described my invention, what I claim to be new and desire to protect by Letters Patent is:

1. In apparatus of the class above described, a high resonant frequency coupling comprised of:
   a. an input member;
   b. an output member; and
   c. means, including visco-elastic means, interconnecting said input and output members whereby motion of said input member is transmitted to said output member through said means.

2. The apparatus of claim 1 in which the visco-elastic means is comprised of material exhibiting a high shear modulus at low frequencies of operation.

3. The apparatus of claim 1 in which the visco-elastic means is comprised of material exhibiting at least two substantially different shear modulus characteristics.

4. The apparatus of claim 1 in which the input and outmembers are rotatably journaled.

5. The apparatus of claim 1 in which the input and output members are linearly journaled.

6. The apparatus of claim 1 in which the visco-elastic material exhibits shear modulus characteristics related to frequency.

7. The apparatus of claim 6 in which the shear modulus characteristic components decrease as the frequency increases.

8. The apparatus of claim 6 in which the visco-elastic material is operative in the range of 1 to 10,000 Hz/sec.

9. The apparatus of claim 7 in which the visco-elastic material is operative in the range of 1 to 10,000 Hz/sec.

10. The apparatus of claim 1 in which the input and output members of the coupling are operatively connected to the output shaft of a servo motor and the input shaft of a tachometer respectively and the tachometer is connected through control apparatus to the servo motor to drive the same at a predetermined speed.

* * * * *